US011501086B2

(12) United States Patent
    Mars

(10) Patent No.: US 11,501,086 B2
(45) Date of Patent: Nov. 15, 2022

(54) SYSTEMS AND METHODS FOR ZERO-SHOT, FAST-GENERATION AND IMPLEMENTATION OF AN INTELLIGENT VIRTUAL DIALOGUE AGENT USING ONE OR MORE PRE-TRAINED MACHINE LEARNING-BASED LANGUAGE MODELS AND A RESPONSE CORPUS

(71) Applicant: ZeroShotBot, Inc, Ann Arbor, MI (US)

(72) Inventor: Jason Mars, Ann Arbor, MI (US)

(73) Assignee: ZeroShotBot, Inc., Ann Arbor, MI (US)

( * ) Notice: Subject to any disclaimer, the term of this patent is extended or adjusted under 35 U.S.C. 154(b) by 0 days.

(21) Appl. No.: 17/712,173

(22) Filed: Apr. 3, 2022

(65) Prior Publication Data

US 2022/0318518 A1    Oct. 6, 2022

Related U.S. Application Data

(60) Provisional application No. 63/219,783, filed on Jul. 8, 2021, provisional application No. 63/171,051, filed on Apr. 5, 2021.

(51) Int. Cl.

| | |
|---|---|
| *G06F 40/35* | (2020.01) |
| *H04L 51/02* | (2022.01) |
| *G06N 5/04* | (2006.01) |
| *G06F 40/44* | (2020.01) |
| *G10L 15/06* | (2013.01) |

(52) U.S. Cl.
CPC .............. *G06F 40/35* (2020.01); *G06F 40/44* (2020.01); *G06N 5/04* (2013.01); *G10L 15/063* (2013.01); *H04L 51/02* (2013.01)

(58) Field of Classification Search
CPC ............ G06F 40/35; G06N 5/04; H04L 51/02
See application file for complete search history.

(56) References Cited

U.S. PATENT DOCUMENTS

| | | | |
|---|---|---|---|
| 2019/0369957 A1* | 12/2019 | Spector | ............... G06F 16/3329 |
| 2020/0019642 A1* | 1/2020 | Dua | ..................... G06N 3/0454 |
| 2020/0019863 A1* | 1/2020 | Dua | ..................... G10L 15/197 |

(Continued)

*Primary Examiner* — Akwasi M Sarpong
(74) *Attorney, Agent, or Firm* — Padowithz Alce; Alce PLLC

(57) ABSTRACT

System and method of building a zero-shot training, machine learning-based virtual dialogue agent includes identifying a response corpus comprising a plurality of distinct response samples; providing the response corpus to a virtual agent generator; generating, by one or more pre-trained machine learning language models, a distinct embeddings inference for each of the plurality of distinct response samples; forming an embeddings-based architecture for response generation based on the distinct embeddings inference for each of the plurality of distinct response samples, wherein the embeddings-based architecture includes a mapping of the distinct embeddings inference for each of the plurality of distinct response samples to an n-dimensional space; instantiating a virtual dialogue agent based on receiving user stimuli; and computing, using the embeddings-based architecture, a response inference to the user stimuli, wherein the computed response inference is based on identifying one distinct embeddings inference of a distinct response sample of the response corpus.

12 Claims, 9 Drawing Sheets

(56) References Cited

U.S. PATENT DOCUMENTS

| | | | |
|---|---|---|---|
| 2020/0365145 A1* | 11/2020 | Ryu | G10L 15/063 |
| 2021/0043194 A1* | 2/2021 | Krishnamurthy | G06F 16/3329 |
| 2021/0192397 A1* | 6/2021 | Rastogi | G06F 40/20 |
| 2021/0406718 A1* | 12/2021 | Hall | G06N 5/04 |

* cited by examiner

200

Creating a Response Corpus S210

Translating the Response Corpus to Machine Learning Model Input S220

Configuring a Fast-Generated Virtaul Dialogue Agent S230

Identifying User Input Data S310

Generating a Response Inference S320

Identifying a Response to User Stimulus or User Utterance S330

Tuning the Virtual Dialogue Agent S340

FIGURE 3

| RESPONSE CORPUS | | |
|---|---|---|
| Respone 1 | Anchor Response 1 | System-Displayed Response 1 |
| Response 2 | Anchor Response 2 | Null |
| Response 3 | Anchor Response 3 | System-Displayed Response 3 |
| Response 4 | Anchor Response 4 | Null |
| Response 5 | Anchor Response 5 | System-Displayed Response 5 |

FIGURE 6

SYSTEMS AND METHODS FOR ZERO-SHOT, FAST-GENERATION AND IMPLEMENTATION OF AN INTELLIGENT VIRTUAL DIALOGUE AGENT USING ONE OR MORE PRE-TRAINED MACHINE LEARNING-BASED LANGUAGE MODELS AND A RESPONSE CORPUS

CROSS-REFERENCE TO RELATED APPLICATIONS

This application claims the benefit of U.S. Provisional Application No. 63/171,051, filed Apr. 5, 2021 and U.S. Provisional Applications No. 63/219,783, filed Jul. 8, 2021, which are incorporated in their entireties by this reference.

TECHNICAL FIELD

The inventions herein relate generally to the virtual assistant field, and more specifically to a new and useful system and method for generating and deploying artificially intelligent virtual agents using machine learning.

BACKGROUND

Modern virtual assistants may typically be employed to perform various tasks or services based on an interaction with a user. Typically, a user interacting with a virtual assistant may pose a question, a message, or otherwise submit an input to the virtual assistant, to which, the virtual assistant may provide a response or result to the user. Many of these virtual assistants may be constructed using machine learning, which typically requires significant business resources and/or investments to generate a production-ready or enterprise-level virtual assistant.

That is, generating these production-ready virtual assistants or enterprise-level virtual assistants not only require developers skilled in machine learning and natural language processing, but further requires an extensive amount of training samples to train machine learning models on various machine learning tasks, as well as long development timelines. Moreover, scaling these production-ready virtual assistants and/or enterprise-level virtual assistants to perform new tasks and/or functions require more training, more training samples, and more development time.

Therefore, there is a need in the virtual assistant field to generate virtual assistants (or virtual agents) that require limited-to-no training and/or programming experience, as well as the ability to produce and scale virtual assistants (or virtual agents) through a user-friendly interface. The embodiments of the present application described herein provide technical solutions that address, at least, the needs described above, as well as the deficiencies of the state of the art.

BRIEF SUMMARY OF THE INVENTION(S)

In one embodiment, a method of building a zero-shot training, fast-generated machine learning-based virtual dialogue agent includes identifying a response corpus comprising a plurality of distinct response samples to likely user stimuli; providing the response corpus, as model input, to a virtual agent generator comprising one or more pre-trained machine learning language models; generating, by the one or more pre-trained machine learning language models, a distinct embeddings inference for each of the plurality of distinct response samples; forming an embeddings-based architecture for response generation based on the distinct embeddings inference for each of the plurality of distinct response samples, wherein the embeddings-based architecture includes a mapping of the distinct embeddings inference for each of the plurality of distinct response samples to an n-dimensional space or an embeddings data structure; instantiating, via a web-accessible user interface, a virtual dialogue agent based on receiving user stimuli; and computing, using the embeddings-based architecture, a response inference to the user stimuli, wherein the computed response inference is based on identifying one distinct embeddings inference of a distinct response sample of the response corpus.

In one embodiment, the embeddings-based architecture is defined by creating a response nexus between each distinct response sample of the response corpus and each distinct embeddings inference of each of the plurality of distinct response samples of the response corpus.

In one embodiment, the method includes configuring a proxy response matrix includes digitally tethering each distinct response sample of a subset of the plurality of distinct response samples to a distinct proxy response that is publicly returned if the computed distinct response sample comprises one distinct response sample of the subset.

In one embodiment, computing the response inference to the user stimuli includes: performing a look-up search of the proxy response matrix, wherein the look-up search comprises the one distinct response sample; and identifying a distinct proxy response having a matrix-based association with the one distinct response sample; and the response inference comprises the distinct proxy response.

In one embodiment, each distinct proxy response of the proxy response matrix is a tunable response.

In one embodiment, the method includes configuring a proxy response matrix includes digitally tethering the distinct inference embeddings of each distinct response sample of the subset to a distinct proxy response.

In one embodiment, computing the response inference to the user stimuli includes: performing a look-up search of the proxy response matrix, wherein the look-up search comprises a distinct inference embeddings of the distinct response sample; and identifying a distinct proxy response having a matrix-based association with the distinct inference embeddings of the distinct response sample; and the response inference comprises the distinct proxy response.

In one embodiment, the method includes configuring a response bank including: digitally linking a distinct user stimuli to a distinct response sample of the response corpus; computing a joint embeddings inference based on the digital linking; and storing the joint embeddings inference in association with the distinct user stimuli and the distinct response sample.

In one embodiment, the method includes zero-shot tuning a response behavior of the virtual dialogue agent, wherein the zero-shot tuning includes: expanding embeddings inferences of the response corpus by digitally linking a target distinct embeddings inference of a distinct response sample with an embeddings inference of an embeddings inference of a new response sample.

In one embodiment, the method includes zero-shot tuning a response behavior of the virtual dialogue agent, wherein the zero-shot tuning includes: manipulating one or more embeddings inferences of the response corpus within the n-dimensional space by increasing or decreasing a multi-dimensional distance between the one or more embeddings inferences of the response corpus and an embeddings inference of a target user stimuli.

In one embodiment, the method includes zero-shot tuning a response behavior of the virtual dialogue agent, wherein the zero-shot tuning includes: digitally linking a distinct user stimuli to a distinct response sample of the response corpus that causes one or more changes of the embeddings inferences of the plurality of distinct response samples within the n-dimensional space.

In one embodiment, a method of building zero-shot training, machine learning-based virtual dialogue agents, the method comprising: identifying a plurality of distinct response corpora, wherein each response corpus of the plurality of distinct response corpora comprises a domain-specific set of distinct response samples to likely user stimuli within the domain; providing each of the plurality of distinct response corpora, as model input, to one or more pre-trained machine learning language models; generating, by the one or more pre-trained machine learning language models, a distinct set of embeddings inferences for each of the response corpus of the plurality of distinct response corpora; configuring a plurality of distinct virtual dialogue agents based on each response corpus of the plurality of distinct response corpora, wherein configuring each virtual dialogue agent includes: forming an embeddings-based architecture for each of the plurality of distinct virtual dialogue agents based on the distinct set of embeddings inferences for each response corpus of the plurality of distinct response corpora, wherein the embeddings-based architecture includes a mapping of each distinct embeddings inference for each of the plurality of distinct response samples of a respective response corpus of the plurality of distinct response corpora to an n-dimensional space or an embeddings data structure; and selectively instantiating, via a web-accessible user interface, one or more of the plurality of distinct virtual dialogue agents based on receiving user stimuli; and computing, using the embeddings-based architecture, a response inference to the user stimuli that is derived based a distinct response sample of the respective response corpus of the plurality of distinct response corpora.

In one embodiment, a method of implementing a fast-generated virtual dialogue agent includes receiving user stimuli, via a web-enabled virtual dialogue agent interface; converting the user stimuli, by a computer implementing one or more pre-trained language machine learning models, to a stimuli embeddings inference; computing a response inference based on the corpus of stimuli embeddings, wherein computing the response inference includes: evaluating the stimuli embeddings inference against a plurality of distinct response embeddings of a corpus of distinct response samples; and performing an embeddings search for a response embeddings of a distinct response sample of the plurality of distinct response embeddings based on the stimuli embeddings inference; generating an automated response to the user stimuli, via the web-enabled virtual dialogue agent interface, based on returning the response embeddings of the one response sample.

In one embodiment, performing the embeddings search includes: using the stimuli embeddings inference to search one or more embeddings-based data structures for an associated response embeddings.

In one embodiment, performing the embeddings search includes: identifying a response embeddings nearest the stimuli embeddings inference within a multi-dimensional space.

In one embodiment, the method includes implementing a proxy response matrix comprising a plurality of distinct response samples digitally tethered to a plurality of distinct proxy responses, wherein a proxy response of the plurality of distinct proxy response as the automated response based on a matrix-based association of the proxy response to the response embeddings of the one response sample.

In one embodiment, generating the automated response to the user stimuli includes: performing a look-up search of the proxy response matrix, wherein the look-up search comprises the response embeddings of the one response sample or the one response sample; and identifying the proxy response having the matrix-based association with the one response sample.

In one embodiment, the user stimuli comprise a user query or a user utterance.

BRIEF DESCRIPTION OF THE FIGURES

FIG. 2 illustrates an example method of configuring a virtual agent in accordance with one or more embodiments of the present application;

FIG. 3 illustrates an example method of deploying a virtual agent in accordance with one or more embodiments of the present application;

FIG. 6 illustrates an example representation of a response corpus in accordance with one or more embodiments of the present application;

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

Figure 1:
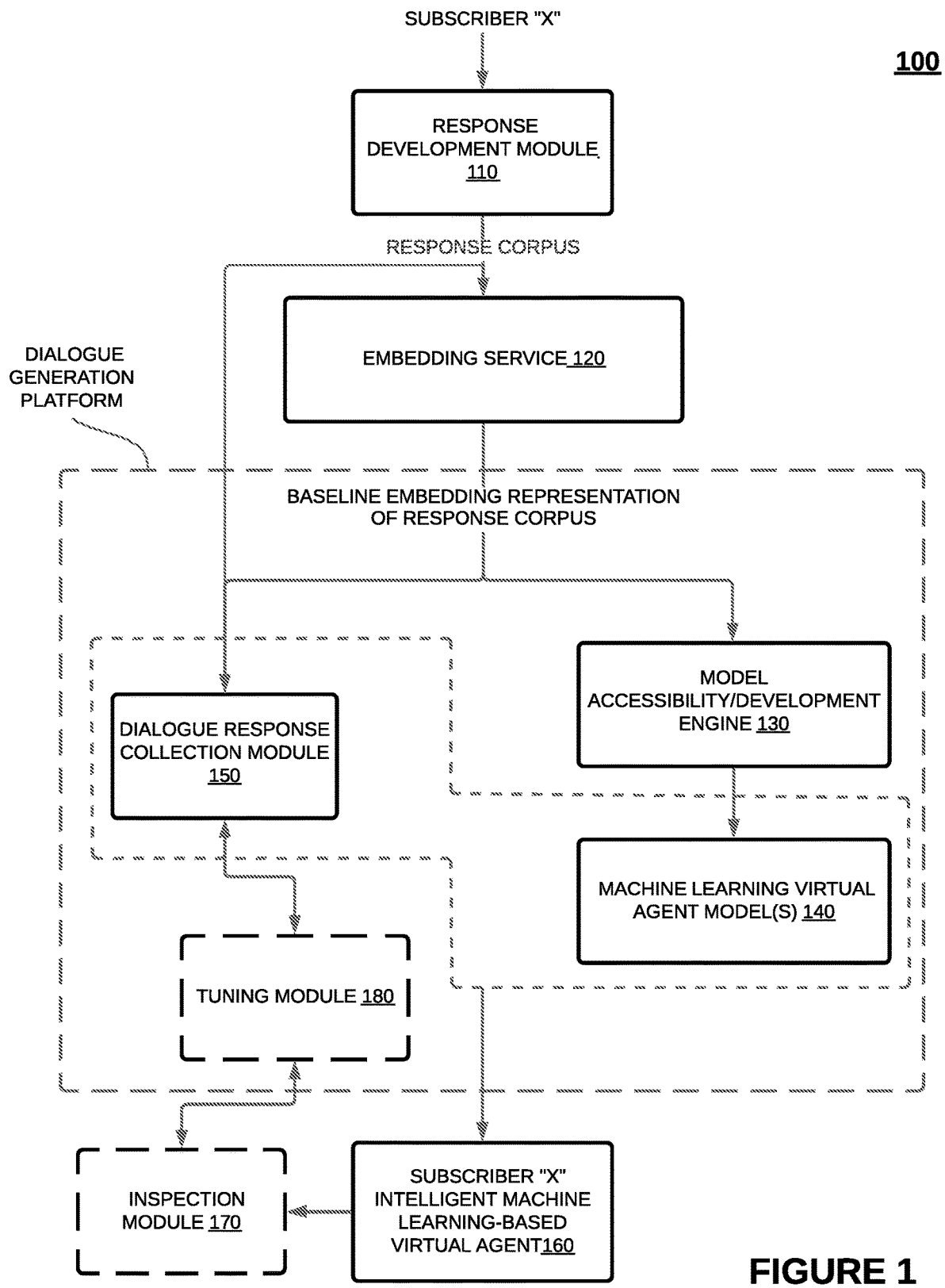
FIG. 1 illustrates a schematic representation of a system in accordance with one or more embodiments of the present application.

1. System for Zero-Shot Generation and Deployment of a Machine Learning-Based Virtual Dialogue Agent As shown in FIG. 1, a system 100 that may configure and deploy a machine learning-based virtual agent may include a response development module 110, an embedding service 120, a model accessibility/development engine 130, a machine learning-based virtual agent model 140, a dialogue response collection module 150, and an intelligent machine learning-based virtual agent 160. The system may optionally include an inspection module 170 and a tuning module 180.

In one or more preferred embodiments, the system 100 may function to configure and/or deploy the intelligent machine learning-based virtual agent 160 to enable an automated conversational experience between a user and a subscriber.

1.1 Response Development Module

In one or more embodiments, a response development module 110 may be in digital communication with a response development interface (or client interface). For instance, the response development module 110 may be configured to ingest (or identify) responses inputted by a subscriber, at the response development interface, to construct a corpus of responses (e.g., a response corpus).

In one or more embodiments, the response development module 110 may interface with a subscriber that may provide a source of knowledge (or a source of responses) for a machine learning-based virtual agent 160. Accordingly, in one or more embodiments, the response development interface may be configured to allow for manual and/or bulk upload of responses that may be identifiable to the response development module 110. In some embodiments, the response development interface may be configured to allow a subscriber to manually input a string of text that may define an individual response, however, in alternative embodiments, the response development interface may also be configured to accept, as input, documents, files, or the like comprising a collection of response for uploading the collection of responses in bulk.

In one or more embodiments, the machine learning-based virtual agent 160 (may also be referred to herein as a "machine learning-based virtual assistant") may communicate with an intermediary service that may store the response corpus to rapidly identify one or more responses based on user input (e.g., messages, questions, queries, commands, or the like).

1.2 Embedding Service

In one or more embodiments, an embedding service 120 may preferably function to receive the response corpus as input and output an embedded response representation for each response (or response item) of the response corpus. In some embodiments, the embedding service may be a sentence (or text) embeddings service that may be configured to compute embedded response representations.

Additionally, or alternatively, the embedding service 120 may function to generate an embedded response space that may map each of the computed embedded response representations associated with a corresponding response (or response item) of the response corpus to the embedded response space. In one or more embodiments, the embedded response space may function to graphically associate (or cluster) semantically similar responses closer to one another than unrelated (or dissimilar) responses.

1.3 Model Accessibility/Development Engine

In one or more embodiments, the model accessibility/development engine 130 may preferably include storing and/or at least capable of accessing a plurality of pre-trained and/or pre-developed language processing models. In some embodiments, each of the plurality of language processing models may be pre-developed and/or pre-trained for reading, understanding, interpreting human language, and/or making predictions based on user inputs or user stimuli.

Additionally, in some embodiments, the model accessibility/development engine 130 may store and/or identify the baseline embedded response representations computed by the embedding service 120 to identify and/or select one or more applicable pre-trained language processing models based, in part, on the embedding values. In some embodiments, an algorithmic structure of the machine learning virtual agent model 140 underlying the virtual dialogue agent 160 may be the entirety of the plurality of accessed pre-trained language processing models and/or the stored language processing models outputted by the model accessibility/development engine 130.

In a preferred embodiment, the machine learning virtual agent model 140 that may be accessed, generated, and/or outputted by the model accessibility/development engine 130 may be capable of predicting and/or inferring responses based on user input.

Additionally, or alternatively, the model accessibility/development engine 130 may implement one or more ensembles of pre-trained or trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, Mobile-BERT, TinyBERT, GPT, GPT-2, GPT-3, GPT-4 (and all subsequent iterations), ELM0, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial test squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

1.4 Dialogue Response Collection Module

In one or more embodiments, the dialogue response collection module 150 may preferably function as the response repository for the machine learning-based virtual agent 160. Accordingly, in one or more preferred embodiments, the response collection module 150 may be configured to collect and/or store the constructed response corpus generated by the response development module no and the embedded response representations of the response corpus computed by the embedding service 120.

Additionally, in one or more preferred embodiments, the response collection module 150 may be combinable (or associated) with the selected or the identified machine learning virtual agent model(s) 140 (e.g., the pre-trained language processing models) outputted by the model accessibility/development engine 130 to form the underlying structure of the virtual dialogue agent 160.

1.5 Inspection Module

Optionally, in one or more embodiments, the inspection module 170 may preferably function to inspect or test machine learning virtual agent 160. In some embodiments, the inspection module 170 may enable a subscribing user (e.g., a subscriber) to inspect and/or test the response behavior before or after implementation (or deployment) of the machine learning virtual agent (e.g., the machine learning virtual agent 160).

Accordingly, in some embodiments, the subscriber may prefer to inspect the machine learning-based virtual agent 160 before implementation. Alternatively, the subscriber may prefer to inspect the machine learning-based virtual agent 160 after implementation. In either embodiment, the machine learning-based virtual agent 160 may be inspected (by the subscriber) by inputting messages, questions, or other command-related inputs to understand the response behavior of the virtual assistant 160.

1.6 Tuning Module

Optionally, in one or more embodiments, the tuning module 180 may preferably function to tune or modify the response behavior of the machine learning-based virtual agent 160 in accordance with a determination that tuning may be needed. In some embodiments, tuning the machine learning virtual agent may include structurally reforming an embedded association between user generated messages (e.g., user questions, user queries, or the like) and corresponding subscriber generated responses.

In some embodiments, tuning the machine learning virtual agent may include reshaping the association (or linkage) between an embedded response space and an inferred response space. That is, in one or more embodiments, the tuning module 180 may function to tune the response behavior of the virtual agent by repositioning a target response node (or a target response cluster) of the embedded response space to be more pronounced (e.g., closer) to one or more inferred response representations associated with user input (e.g., the user input or user stimulus).

2. Method for Configuring an ML-Based Virtual Dialogue Agent|Zero-Shot Training Agent Creation As shown in FIG. 2, the method 200 for configuring an instant-virtual dialogue agent includes creating a response corpus S210, translating the response corpus to machine learning model input S220, and configuring a fast-generated virtual dialogue agent S230.

Generally, in one or more embodiments, the method 200 may include a zero-shot learning technique for an instant-generation of a machine learning-based chatbot or virtual dialogue agent based primarily on an input of desired responses of the chatbot or virtual dialogue agent. In such embodiments, the instant- or quick-generation of the chatbot or virtual dialogue agent does not include a training or learning process of a machine learning algorithm as may be typically performed in a creation of various machine learning-inspired chatbots. Accordingly, a subscriber desiring to create a machine learning-based virtual agent or chatbot may implement one or more steps of the method 200 to create a machine learning-based virtual agent within seconds or minutes of providing solely or primarily a desired or an expected set of responses that the virtual agent might provide in response to some user stimulus. Thus, using the method 200, a development and/or a training of the one or more machine learning models/algorithms underlying the virtual agent may be avoided altogether.

2.10 Building a Response Corpus|Creating an Answer Bank

S210, which includes identifying a response corpus, may function to identify a plurality of expected or desired responses to user stimulus or user utterances to a virtual agent. In some embodiments, expected (virtual agent) response samples may be obtained from any suitable source including, but not limited to, human agent responses in production logs of contact centers or the like, manuscripts or transcriptions of human-to-human conversations/interactions, and/or may be responses that are fabricated or engineered. A response item, as generally referred to herein, may include content, preferably textual, that the system 100 and/or the method 200 may use to instantly build a virtual dialogue agent and communicate (or converse/interact) with a target user. For instance, the plurality of responses of the response corpus (or an answer bank) may include responses (or answers) or response items that a subscriber or user may prefer the system 100 and/or the method 200 use to intelligently communicate and/or respond to utterances or messages (e.g., questions, inputs, commands, etc.) posed by a target user interfacing directly or indirectly with a virtual dialogue agent of the system 100 and/or the method 200.

As another example, in one or more embodiments, identifying a plurality of responses comprises constructing a corpus of responses (e.g., the response corpus) that includes a plurality of response items. In operation, the response corpus may function to provide the system 100 (implementing the method 200) a collection of responses at one time that a subscriber may prefer that the system 100 and/or the method 200 uses to create a virtual agent automatically and instantly and further regulate an available set of responses by the virtual agent to user stimulus.

Additionally, or alternatively, identifying the response corpus may include providing multiple, distinct instances of an example or expected response to user stimulus via a client interface or the like. In one or more embodiments, the client interface may be in operable communication with a fast-generation chatbot service or the like that may function to receive the corpus of expected response items in any suitable form for creating a virtual dialogue agent.

2.10 (i) Modes of Constructing a Response Corpus

Figure 4:
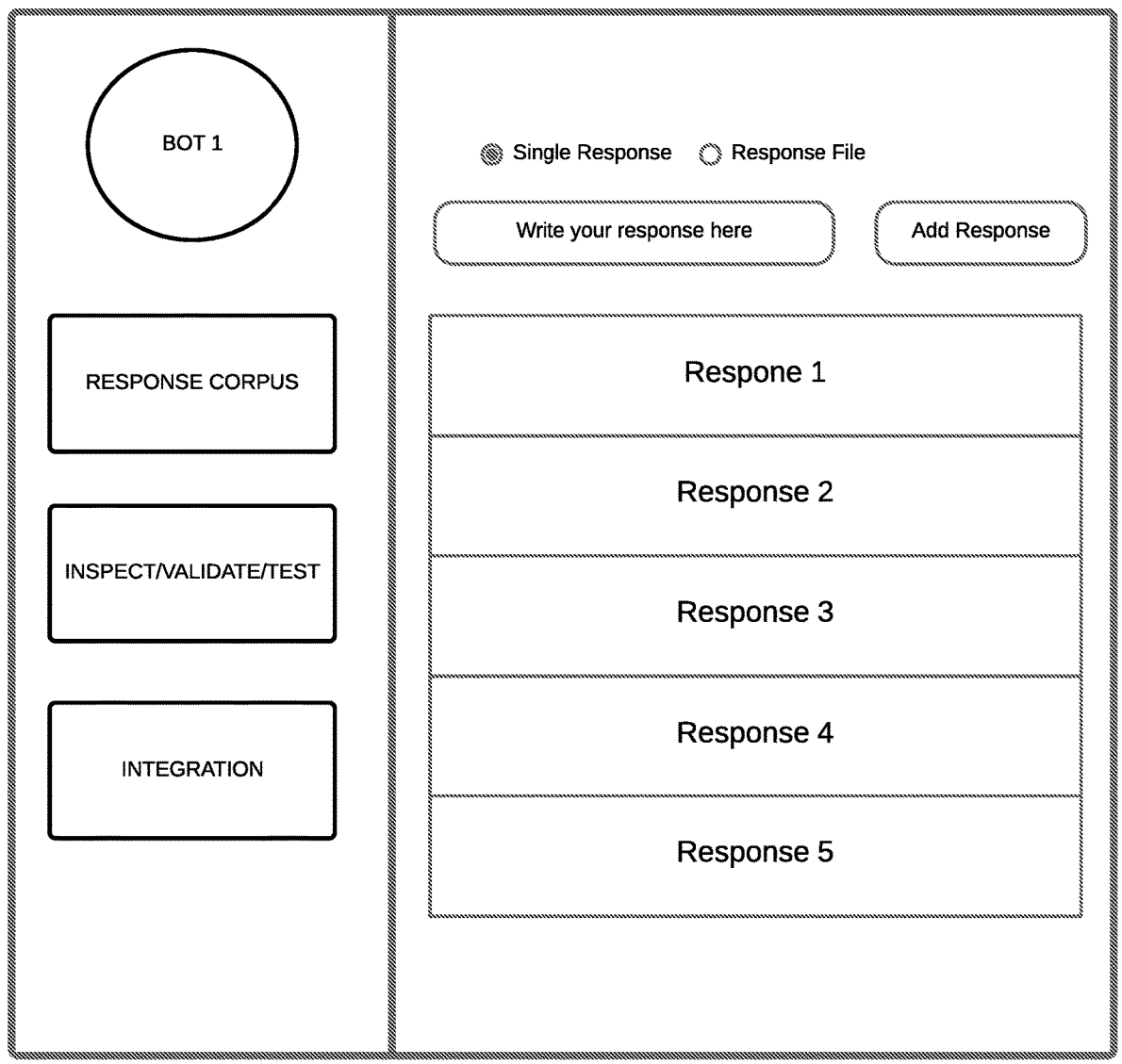
FIG. 4 illustrates an example interface for manually constructing a response corpus in accordance with one or more embodiments of the present application.

It shall be noted that S210 may function to identify (or construct) a response corpus in a variety of modes based upon a preferred data transmission scheme of the subscriber. For instance, in a first implementation, a target subscriber may prefer to manually construct each response of the response corpus by inputting (e.g., typing) a string of text that may define the response via a response and/or agent generation development interface, as shown generally by way of example in FIG. 4. In other words, the subscriber may prefer to manually construct each response of the response corpus via the response development interface. At least one technical benefit of such implementation may provide the subscriber a real-time or in-depth understanding of the capabilities (e.g., limitations and/or strengths) of the response corpus, and thus the virtual agent.

Figure 5:
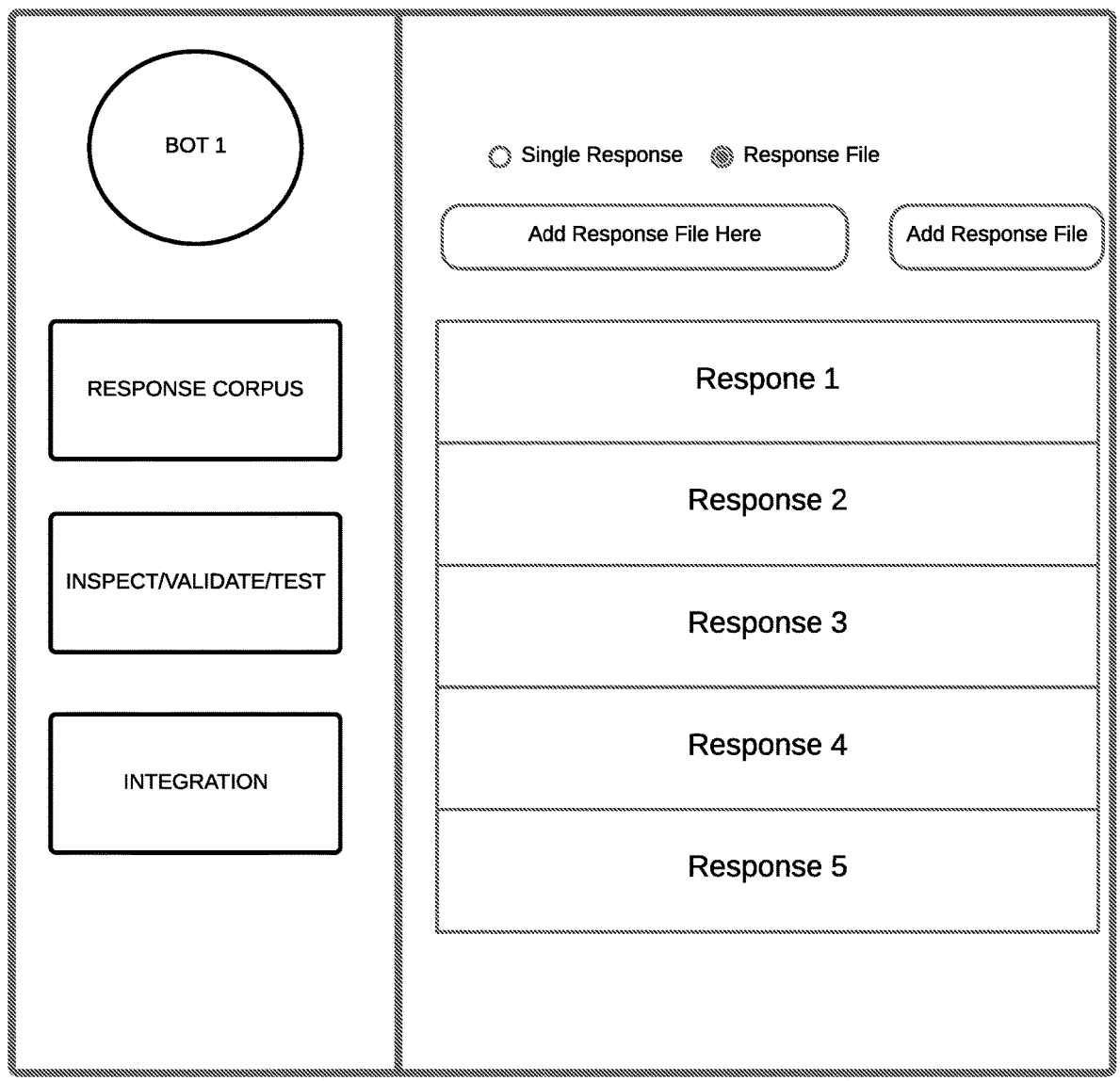
FIG. 5 illustrates an example interface for automatically constructing a response corpus in accordance with one or more embodiments of the present application.

Alternatively, in a second implementation, a target subscriber may prefer to automatically construct a response corpus by uploading one or more documents (or files) via the response development interface, as shown generally by way of example in FIG. 5. In a preferred embodiment, the one or more pre-constructed documents or the one or more files may include a plurality of responses (e.g., response to FAQs, answer manual, etc.) that the subscriber may prefer a virtual agent of the system 100 and/or the method 200 utilizes to intelligently respond to user messages (or inputs). At least one technical benefit of such implementation may be to provide a streamlined approach to automatically constructing a response corpus, which may reduce the time required to generate a machine learning-based virtual assistant.

In a third implementation, the target subscriber may prefer to construct a response corpus using a combination of the first implementation (e.g., manual construction of the response corpus) and the second implementation (e.g., automatic construction of the response corpus). For example, in one or more embodiments, the target subscriber may prefer to both manually and automatically construct one or more responses of the response corpus. In such example, a first portion (e.g., a first response) of the response corpus may be constructed manually by inputting (e.g., typing) a string of text into the response development interface, and a second portion (e.g., a second response, a third response, and/or n-number of responses) of the response corpus may be constructed automatically by uploading a file (or a document) comprising a collection of responses. In such implementation (e.g., the third implementation), the subscriber may prefer to combine the accuracy of the first implementation with the efficiency of the second implementation.

2.10 (ii) Response Structure|Predicted (Anchor) Response|Proxy (Display) Response Optionally, in one or more embodiments, each response item of the response corpus may be an anchor response that may additionally or alternatively be associated (or linked, mapped to, etc.) with a proxy response or a system-displayed response (e.g., display response or display answer), as shown generally by way of example in FIG. 6. An anchor response, as generally referred to herein, preferably relates to a fixed or expected response included in a response corpus for which an embedding value of the anchor response may utilized in computing and/or identifying a most probable response to a user communication or user utterance. In a preferred embodiment, a computed inference or a predicted response by the one or more pre-trained language models may be evaluated against the anchor to identify whether the anchor response is a most likely response to a user communication.

In one or more embodiments, if the anchor response may be associated with or linked to a proxy response (i.e., system-provided output to a user communication), S210 may function to expose the proxy response as a most likely response to a user communication in lieu of the anchor response. Thus, in such embodiments, the embedding value of the anchor response may be used for internal response computations such that the anchor response may not be exposed as an actual response to a user communication. However, in one or more embodiments, if the anchor response is not associated with or linked to a proxy response, S210 may function to expose the anchor response as a most likely response to a user communication when internal response computations identify the anchor response as the most likely response to a user communication.

As mentioned above, a (display) response output layer or the like may be overlayed and mapped to a predicted (anchor) response output layer, such that a prediction of a given anchor response causes an output to a user system (client device or interface) of an associated or corresponding display response. In some embodiments, each distinct anchor response within the predicted response output layer may be tethered or associated with a distinct display response in the response output layer. In a variant embodiment, only a subset of the anchor response may be mapped to display responses.

Accordingly, in one or more embodiments, while a system-displayed (or output) response may be generally tethered or linked to an anchor response/predicted response, the system-displayed response may be different than the anchor response or may include a different semantically similar representation of the anchor response. Thus, in some embodiments, the system-displayed response may be the same as the anchor response. However, in one or more other embodiments, the system-displayed response may vary from the anchor response to which it may be tethered and may include other content-related features (e.g., textual content, static content, dynamic content, graphics, videos, images, emoticons, buttons, etc.) not readily represented by a format of the anchor response. Thus, in some embodiments, a system-output response may function as a proxy response that may be provided in the place of the predicted anchor response. Stated differently, the system 100 and/or the method 200 may use a corresponding system-displayed response associated (or linked or correlated) to an anchor response to communicate (or converse) with the subscriber and/or the user.

For example, in a first implementation, each response item of the response corpus may include only anchor responses. Alternatively, in a second implementation, each response item of the response corpus may include an anchor response and an associated system-displayed response. Additionally, or alternatively, in a third implementation, a first subset of responses of the response corpus may include only anchor responses and a second subset of responses (of the response corpus) may include anchor responses and associated system-displayed responses related to the anchor responses.

It shall be noted that in some embodiments, the anchor response may be substantially similar (or equivalent) to the system-displayed response. It shall also be noted that while in some instances a proxy response may be referred to herein as a "system-displayed response", this should not be limited to only include responses by a virtual agent or system implementing a virtual agent that is made in a graphical form. Rather, a system-displayed response may be communicated in any suitable form including, but not limited to, audibly, haptically, through visual or non-visual signals, and/or the like.

2.10 (iii) Response Classification Categories or Response Domains

Optionally, in one or more embodiments, S210 may function to label (or group) responses of the response corpus into one or more response classification categories, domains, and/or topics (e.g., banking, bookings, cancellations, refunds, miscellaneous, etc.). For example, a single response corpus may comprise a plurality of responses spanning across multiple response classification categories.

In alternative embodiments, however, the response corpus may include a plurality of responses that may be identified within a single classification category or domain. For instance, a single response corpus may include a plurality of responses associated with only a single response classification category (e.g., bookings) and a second response corpus may include a plurality of response associated with another response classification category (e.g., cancellations).

As will be further discussed below, the system 10o and/or the method 200 may function to convert the identified (or constructed) response corpus of S210 into embedding values (e.g., embedded response representations).

2.20 Computing Embedding Values|Response Corpus Vectors

S220, which includes computing and storing embedding values for the response corpus, may function to convert or generate vector representations or text representations for each response (e.g., each anchor response) of the response corpus. In one or more preferred embodiments, S220 may function to implement a sentence or text embedding service or language model that may convert response items of the response corpus into numerical-based vector representations.

In one implementation, the sentence or text embedding service or model that may be implemented for converting each response item in the response corpus may be the same or substantially similar to an embedding service or model implemented with a pre-trained machine learning (language) model, described herein. In such implementation because the embedding service or model may be the same for converting the response corpus and training samples or other model inputs of the pre-trained language model, S220 may function to map the vector representations for each response item in the response corpus to an n-dimensional vector space that may be familiar, known, and/or used by the pre-trained language model.

Additionally, or alternatively, in some embodiments, the method 200 may function to implement a plurality of distinct pre-trained language models that may each include an embedding layer (i.e., a hidden layer) or implement a distinct embedding service or language model. In such embodiments, S220 may function to compute one or more distinct sets of embedding values for the response corpus using an embedding layer of a pre-trained language model or using one or more of a plurality of distinct embedding services or models that may be used by the pre-trained language models.

For instance, in one or more embodiments that may include using a sentence or text embedding service to generate text representations based on an input of the response corpus, S220 may function to generate a distinct text representation for each of the plurality of distinct response items of the response corpus.

In a first implementation, S220 may function to input each response item of the response corpus sequentially or individually through an embedding service or language model to create an associated baseline embedded response representation. In such example, a first response of the response corpus (e.g., The delivery fee is $3) may be converted to a first embedded response representation, a second response of the response corpus (e.g., We have a wide selection of vegetarian pizzas) may be converted to a second embedded response representation distinct from the first embedded response representation, and a third response of the response corpus (e.g., Your order will arrive in 30 minutes) may be converted to a third embedded response representation distinct from the first embedded response representation and the second embedded response representation. Stated another way, each response of the response corpus may be an individual input into the sentence or text embedding service to compute a corresponding individual output of an embedded response representation. At least one technical benefit of an individual or discrete approach for creating an embedding representation for each response item of a response corpus may include an ability to specifically track a correspondence between a respective response item and its computed embedded representation thereby enabling a capability to specifically tune or adjust the computed embedded representation within a given multi-dimensional space for embedding values.

Alternatively, in a second implementation, S220 may function to input the response corpus of S210 through an embedding service to create a set of baseline embedded response representations (e.g., $M_r$). In other words, the input into the embedding service may be the entire response corpus and the output (e.g., after processing the response corpus through the embedding service) may be a set of baseline embedded response representations.

In operation, S220 may function to implement any suitable and/or combination of suitable sentence (or text) embeddings techniques or services to compute embedded response representations. Accordingly, in the case that the identified response corpus may span across a diverse set of text representations (or vector values), S220 may function to identify or define the range of embedding values associated with the response corpus.

N-Dimensional Response Embeddings Space

Optionally, S220 includes S225, which may function to associate or map each embedded response representation (or embedded vector representation) of the response corpus into a multi-dimensional vector space (e.g., an n-dimensional embeddings space), that, in one or more embodiments, may be graphically illustrated. In other words, each vector representation of each distinct string of text or word that may define a distinct response of the response corpus may be used as input for creating a mapping item or a point that may be positioned onto the multi-dimensional embedding space.

Accordingly, in such preferred embodiment, the embedded response space (e.g., the n-dimensional embedded response space) may be constructed based on mapping the embedded response representations for each response item of the response corpus. For example, S220 may function to map each embedded response representation that may define a coordinate or vector in the embedded response space.

Additionally, or optionally, each of the embedded representations may be linked, coupled, and/or associated with the anchor response and/or the system-displayed response of the response corpus.

It shall be noted that responses of the response corpus that may share one or more similar characteristics (e.g., response categories, semantically similar responses within a similarity threshold value) or that may have semantically similar meanings may be mapped (or clustered) proximate to one another, in the embedded response space, when compared to unrelated (e.g., dissimilar) responses.

It shall be noted that each of the response corpus, the embeddings values for the response corpus, and/or the n-dimensional mapping of the embeddings values of the response corpus, may sometimes be referred to herein as the "dialogue agent response collection", may be stored in association with one another when configured for a specific virtual dialogue agent. Preferably, the dialogue agent response collection may be stored by an instant-virtual agent generation service or the like for creating chatbots or virtual dialogue agents. Additionally, or alternatively, the dialogue agent response collection may be stored in association with and/or linked to stimuli or question corpus.

2.30 Configuring a Fast-Generated Machine Learning Dialogue Virtual Assistant Based on Response Embeddings S230, which includes configuring a fast-generated virtual dialogue agent, may function to select or create an inference model (e.g., an ensemble or the like) for an instantiation of the virtual dialogue agent based one or more pre-trained language processing models. Accordingly, an inference model as referred to herein may include a single or a combination of pre-trained language models that may be selected for producing a prediction or an inference based on an input (e.g., a user communication).

Additionally, or alternatively, a selection and/or a design of the inferential architecture or inference model of the virtual dialogue agent may be based on or encouraged by attributes of the set of embedding values (e.g., $M_r$) or embeddings mapping of the response corpus designated for the virtual dialogue agent.

In one implementation, a selection and/or a design of the inference model may be based on a range of the embedding values of a response corpus of a subject virtual dialogue agent. That is, the range of the embedding values of the response corpus may be used as a selection criterion for selecting which of a plurality of distinct pre-trained language models may be used to define the inference model of an instantiation of the virtual dialogue agent. For instance, in some circumstances, a system implementing the method 200 may have access to a plurality of distinct pre-trained machine learning models that may distinctly function to produce accurate inferences in select embedding value ranges. In such example, S230 may function to select the one or more pre-trained language models that produce accurate inferences with embedding values having the embedding value range of the response corpus.

In another implementation, a section and/or a design of the inference model may be based on a positioning or arrangement of the embedding values of the response corpus in an n-dimensional space. In some embodiments, the mapping of the embedding values for the response corpus may define a cluster and a location of the cluster and/or a position of a centroid of the cluster may be used as a selection criterion for selecting which of a plurality of distinct pre-trained language models that may be used to define the inference model of an instantiation of the virtual dialogue agent.

Pre-Trained Language Models

In one or more embodiments, each of the plurality of language processing models may be pre-developed and/or pre-trained and capable of at least one of reading, understanding, interpreting human language, and/or producing predictions based on inputs. It shall be noted that without departing from the scope of the claimed invention a pre-trained language processing model may also be referred to as "a machine learning-based virtual assistant model", "a machine learning-based virtual agent model", and/or "a virtual dialogue model".

Accordingly, a pre-trained language processing model, as generally defined herein may be a machine learning-based model configured to aid (or support) a conversational experience with a target user in lieu of a direct human-to-human user experience. For example, one or more pre-trained language processing models may be pre-developed and/or pre-trained on a training dataset that may be a comprehensive (or wide-spread) dataset that may not require the plurality of pre-trained language processing models to be modified, readjusted, and/or fine-tuned for making predictions or inferences based on inputs that were not previously seen during a training phase. Stated differently, each of the plurality of language processing models may be capable of executing new functions or tasks without the need for additional training.

Additionally, it shall be noted that a system or service (e.g., the system 100 implementing one or more steps of the method 200, such as an intermediary chatbot generation service or the like, may function to utilize one or more (and more preferably a plurality of) pre-trained language processing model as the underlying machine learning-based algorithm(s) for a virtual dialogue agent.

In one or more embodiments and which will be further described in the method 300 below, based on at least some portion (e.g., the virtual dialogue agent 150, a virtual assistant, a virtual agent, etc.) of the system 100 and/or the method 200 either directly or indirectly receiving a user stimulus or user utterance, S230 may function to interface directly or through the intermediary service with at least one of (and more preferably each of) the plurality of pre-trained language processing models that may process (or convert), via an embedding layer or the like, the user stimulus or the user utterance into a user input representation and produce an inference or predicted response to the user utterance or message based on the user input representation.

Figure 7:
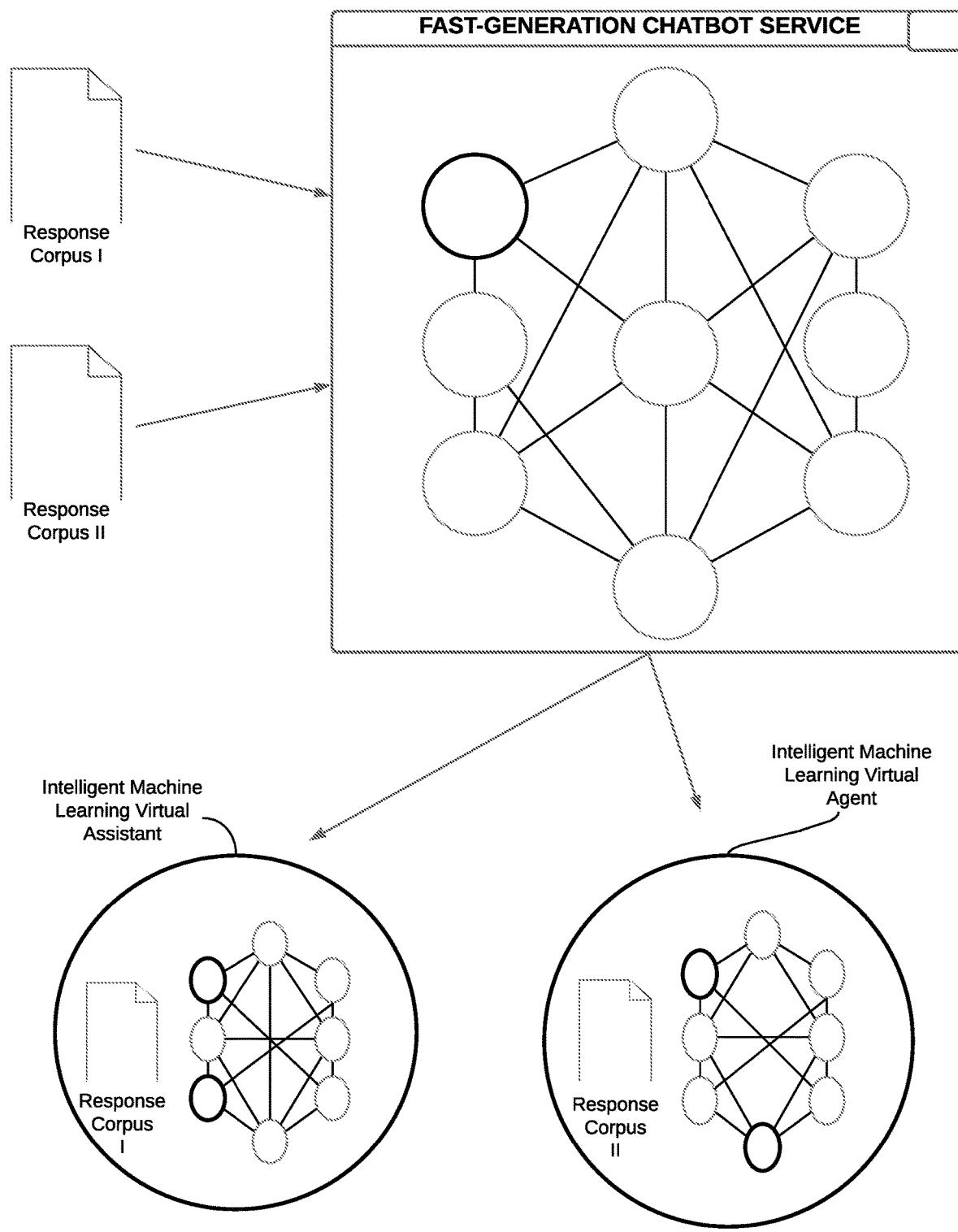
FIG. 7 illustrates an example representation of generating one or more machine learning-based virtual assistants in accordance with one or more embodiments of the present application.

It shall further be noted that at least one technical benefit of configuring a virtual agent based on a zero-shot learning technique involving one or more pre-trained machine-learning based language processing models may provide the capability of understanding and predicting accurate responses to user inputs without a need to develop (e.g., via training data curation, training on dialogue intents, etc.) novel language models, as shown generally by way of example in FIG. 7.

3. Method for Fast-Instantiation of a Virtual Dialogue Agent|Agent Deployment

As shown in FIG. 3, the method 300 for deploying or implementing an instant-virtual dialogue agent includes identifying user stimulus data S310, computing one or more machine learning-based inferences using the user stimulus data S320, identifying a pre-defined response to user stimulus based on the one or more inferences S330, and optionally tuning the virtual dialogue agent S340.

Figure 8:
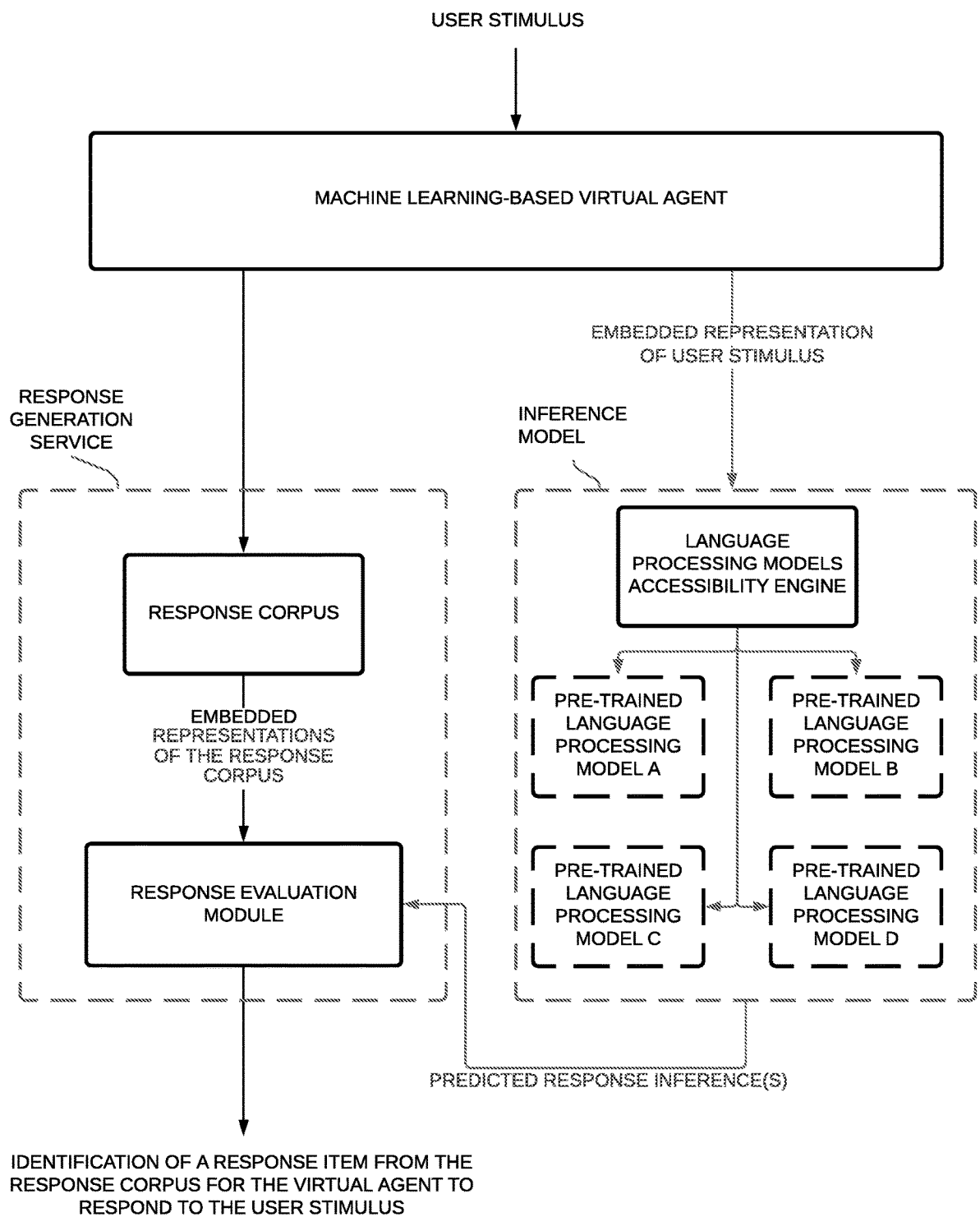
FIG. 8 illustrates an example schematic for implementing portions of the method 300 and a system in accordance with one or more embodiments of the present application.

Generally, in one or more embodiments, the method 300 may enable one or more users (or one or more subscribers) to interact with an interface object, element, or other representation of a virtual dialogue agent to initialize (or start) a conversational experience between the user and the configured virtual agent of the method 200, as shown generally by way of example in FIG. 8.

3.10 Identifying User Input Data|Identifying User Utterance or User Stimulus

S310, which includes identifying, collecting, and/or receiving user input data, may function to identify, collect, and/or receive user input data in the form of a user utterance or user stimulus towards one or more virtual dialogue agents deployed in a production environment of a subscriber. It shall be noted that one or more of the virtual agents deployed in a production environment of a subscriber may be associated with a distinct response corpus previously configured with a chat agent generation service or the like.

In a preferred embodiment, S310 may function receive a user input or user stimulus via a user interface (e.g., an interface of the virtual dialogue agent) accessible by or provided to the user. It shall be noted that, in one or more embodiments, the interface of the virtual dialogue agent may be accessible by a plurality of channels, including but not limited to, a mobile computing device, a web browser (having a website displayed therein), a social network interface, or any other suitable channel or client interface/device for deploying the virtual dialogue agent.

In one or more embodiments, the user utterance or user stimulus may include, but should be not limited to, speech or utterance input, textual input, gesture input, touch input, character input, numerical input, image input and/or any other suitable type of input. It shall be noted that, in one or more embodiments, the user utterance or user stimulus identified, collected, and or received by S310 may be of a single dialogue intent or a plurality of dialogue intents. Additionally, or alternatively, the identified, collected, and or received user stimulus or user utterance may relate to a single dialogue domain or a plurality of dialogue domains.

It shall be noted that, in one or more embodiments, S310 may function to identify, receive, and/or collect the user stimulus or user utterance and transmit, via a computer network or the like, the user stimulus or user utterance to an embedding service that may convert or translate the user stimulus or user utterance into an embedded representation consumable by one or more pre-trained language processing models for producing one or more response inferences or response predictions.

In one or more alternative embodiments, S310 may function to directly pass the user input or user stimulus, in a raw state, to one or more of the pre-trained language processing models that may include an embedding layer used to generate embedding values for input into one or more inference layers of the models for producing one or more response inferences.

As will be further discussed below, in one or more embodiments, the embedded or vector representation associated with a user utterance or user stimulus may assist with providing the system 100, the method 200, and/or the method 300 the capability of understanding a relational strength between the embedded representation of the user stimulus or the user utterance and the embedded response representations of the response corpus for intelligently aiding and/or improving a conversational experience.

3.20 Generating Response Inferences Utilizing One or More Pre-Trained Language Processing Models S320, which includes generating a response inference, may function to provide the user communication or user stimulus as input to one or more pre-trained language models. In some embodiments, a chatbot generation service or the like may function as an intermediary between a client interface implementing a virtual dialogue agent and one or more remote or cloud-based systems implementing the one or more pre-trained language models. In such embodiments, S320 may function to provide or transmit the user stimulus from the client interface (i.e., the virtual dialogue interface) to the chatbot generation user and in response to a receipt of the user stimulus, the chatbot generation service may function to directly interface with the one or more pre-trained language models for generating at least one response inference based on the user stimulus.

In operation, S320 may function to operably communicate with (e.g., access, retrieve, or the like) one or more of the plurality of pre-trained language processing models identified by the method 200 or the like. For example, in one or more embodiments, S320 may digitally communicate or digitally interface with one or more of a plurality of language processing models via an application programming interface (API) that may programmatically integrate both the system 100 (implementing the method 200 and method 300) and foreign or third-party systems implementing the one or more pre-trained language processing models. That is, S320 may function to access one or more of the plurality of pre-trained language processing models by requesting or generating one or more API calls that include user stimulus data to APIs of one or more of the pre-trained language processing models for producing one or more inferred responses to the user stimulus.

Accordingly, in one or more embodiments, as the plurality of pre-trained language processing models may be pre-developed and/or pre-trained whereby each of the plurality of pre-trained language processing models may have corresponding configured parameters (e.g., learned weights), the parameters (or weights) of the plurality of language processing models may vary between the distinct pre-trained language models. As a result, each of the distinct language processing models that may process the user stimulus or the user utterance differently and may use distinct embedding models to generate a distinct embedded query representation and may compute a predicted response inference that may vary from other language processing models. For instance, S320 may function to process the user stimulus or user utterance through a plurality of language processing models and each of the language processing models of the plurality of language processing models may be associated with a distinct embeddings models that generates a distinct user stimulus representation.

3.30 Identifying a Response to User Stimulus or User Utterance Utilizing One or More Pre-Trained Language Processing Models S330, which includes identifying a response to user stimulus or user utterance, may function to intelligently identify a response to the user stimulus or user utterance based on computationally (e.g., spatially, numerically, etc.) evaluating one or more predict responses or response inferences of the one or more pre-trained language models against the embedded response representations of the response corpus for a subject virtual dialogue agent.

In one or more preferred embodiments, S330 may function to evaluate each embedded response representation or a subset of the embedded response representations of the response corpus with reference to each response inference computed by the plurality of pre-trained language processing models based on the user stimulus.

In one or more embodiments, if the embedding vector values of an evaluation are based on different embedding models having different vector value ranges or the like, the embedded response representations of the response corpus and the embedded representations of the user stimulus may be normalized to one another. In this way, S330 may function to compute a similarity metric between an inferred response and one or more embedded response representations of the response corpus. In such embodiments, the computation of the similarity metric may include mathematically computing a distance value or a distance similarity metric between each embedded response representation of the response corpus and each inferred response representation produced based on the user stimulus to thereby intelligently identify an optimal or most probable response based on the quantitative analysis of the mathematically computed distance therebetween. It shall be noted that a shorter distance between an embedded response representation and an inferred response representation may express that the two embedded representations signify a higher degree of similarity, and vice versa.

Stated differently, each response of the response corpus may be associated with a corresponding embedded response representation and preferably mapped to an embedded response space and the user stimulus may be associated with one or more inference responses or inference response vectors. In one or more embodiments, the inference response vector may sometimes be mapped to an n-dimensional space and compared or evaluated against a mapping of the embedding values of the response corpus for a subject virtual dialogue agent. Additionally, or alternatively, in some embodiments, the inference response vector may be mapped directly to the n-dimensional space of the embedding values of the response corpus. Accordingly, S330 may function to mathematically compute, for each inference response to the user stimulus produced by the one or more the pre-trained language processing models, which embedded response representation of the response corpus provides the most likely or most probable response to the user utterance or user stimulus through a similarity (or distance) analysis.

For example, in one or more embodiments, S330 may perform a quantitative measurement that computes a distance between each embedded response representation of the response corpus and each inferred response representation that may be computed based on an input of the user stimulus. Accordingly, S330 may further function to identify or select which response from the plurality of responses of the response corpus that may be the most likely response to the user stimulus by identifying the embedded response representation with the smallest (or shortest) distance to the inferred response representation.

It shall be noted that, in one or more embodiments, the selected or optimal response to the user stimulus may be the embedded response representation that occurs with the highest frequency based on the results of the similarity analysis performed for multiple, distinct inferred responses of the plurality of distinct pre-trained language models. For instance, if three (3) distinct response inferences map to a first embedding value of a first response (R_1) of the response corpus based on similarity and two (2) distinct response inferences map to a second embedding value of a second response (R_2), S330 may function to select the first response, R_1, as the most likely or most probable response to the user stimulus since there is a higher frequency of similarity mapping between the inferred responses of the pre-trained language models and a given embedded representation of a response item of the response corpus of a given virtual dialogue agent.

Additionally, or alternatively, in one or more embodiments, the inferred response representation generated by each of the plurality of pre-trained language processing models may be averaged together and the averaged inferred response representation may be used for the similarity analysis computations. In one example, S330 may function to source three (3) response inferences or response predictions from three distinct pre-trained machine learning models based on a given user stimulus. In this example, S330 may function to compute an average inference vector value based on the 3 response inferences and compute a similarity metric between the average vector value and one or more embedded values of the response corpus of a subject virtual dialogue agent.

Additionally, or alternatively, in a variant implementation, S330 may function to intelligently identify a response to the user stimulus regardless of whether a domain or a topic of either of the user stimulus (e.g., query) or stored response of a response corpus is covered by or present in the one or more pre-trained machine learning language models. In one example, the one or more pre-trained machine learning language models may predict or compute an inferred response having a probability or level of confidence that may not satisfy a response threshold (e.g., a minimum probability score or value). In another example, in a computation of a response to a user stimulus, it may be computed that the one or more inferred responses by the one or more pre-trained machine learning language models meets or exceeds a similarity threshold (e.g., a maximum distance between an embedding vector of the inferred response and an embedding vector of a stored response of a response corpus). That is, a distance between the one or more inferred responses may be too far from a nearest embedding vector of a stored response to confidently compute a sufficient similarity.

In either of the above-noted examples and otherwise, S330 may function to intelligently identify a response to a user stimulus using any suitable technique including computing a most probable or likely response based on an evaluation of an embedding value of the user stimulus (or query) and the one or more embedding vectors of the response items of the response corpus. In such embodiments, S330 may function to perform a similarity or distance analysis between an embedding representation of the user stimulus and one or more of the embedding representations of the response items of the response corpus. Accordingly, S330 may function to predict a most probable response (i.e., select a response item) to the user stimulus based on the evaluation of the stimulus/response (query/response) without a need to observe or consider the one or more inferred responses of the pre-trained machine learning language models.

3.40 Tuning a Response Behavior of a Virtual Dialogue Agent|Zero-Shot Linking

Optionally, S340, which includes tuning a virtual dialogue agent, may function to tune or adjust a response behavior of the virtual dialogue agent based on manipulating one or more embedding values associated with a response corpus for the virtual dialogue agent relative to one or more embedding values for a set of user stimuli or queries. In a preferred implementation, the tuning may be a zero-shot linking tuning or a proximity-based tuning of embedding outputs of an embeddings model ($M_q$) for user stimuli and/or queries posed to a virtual dialogue agent and embeddings outputs of an embeddings model ($M_r$) for desired response items of a response corpus for the virtual dialogue agent.

It shall be noted that the virtual dialogue agent may be capable of intelligently and/or effectively responding to inputs posed by the user without tuning. However, in some instances, based on the results of a similarity analysis (described above), a query or user stimulus may be posed to the virtual dialogue agent that may produce a machine learning response inference that may be ambiguous towards multiple potential response embeddings of the response corpus for the virtual dialogue agent. In such instances, it may be possible that among the multiple potential response embeddings options that an unexpected or a misaligned response embedding of the response corpus may be selected and thus, a corresponding misaligned response item may be output in response to the user stimulus or query as a result. That is, a misaligned response may relate to a response to the stimulus or query that is not correct or that fails to satisfy or address a dialogue intent of the stimulus or query.

As one example, consider a user input into the virtual dialogue agent, "I fell off my bike and need to listen to classical music" tethered to a response corpus that may include a first response (e.g., a first anchor response) "If you are in high school, you should listen to more Bach than Mozart" and a second response (e.g., a second anchor response) "If you are in middle school, you should listen to more Mozart than Bach." In operation, the virtual dialogue agent may function to respond to the user input with the second response, "If you are in middle school, you should listen to more Mozart than Bach" based, in part, on the output (e.g., recommendation) of an intermediary chatbot response generation service interfacing or communicating with virtual dialogue agent. However, in such example, the subscriber (or client) may have preferred that the intermediary chatbot response generation service outputted or recommended with the first response (e.g., If you are in high school, you should listen to more Bach than Mozart).

Figure 9:
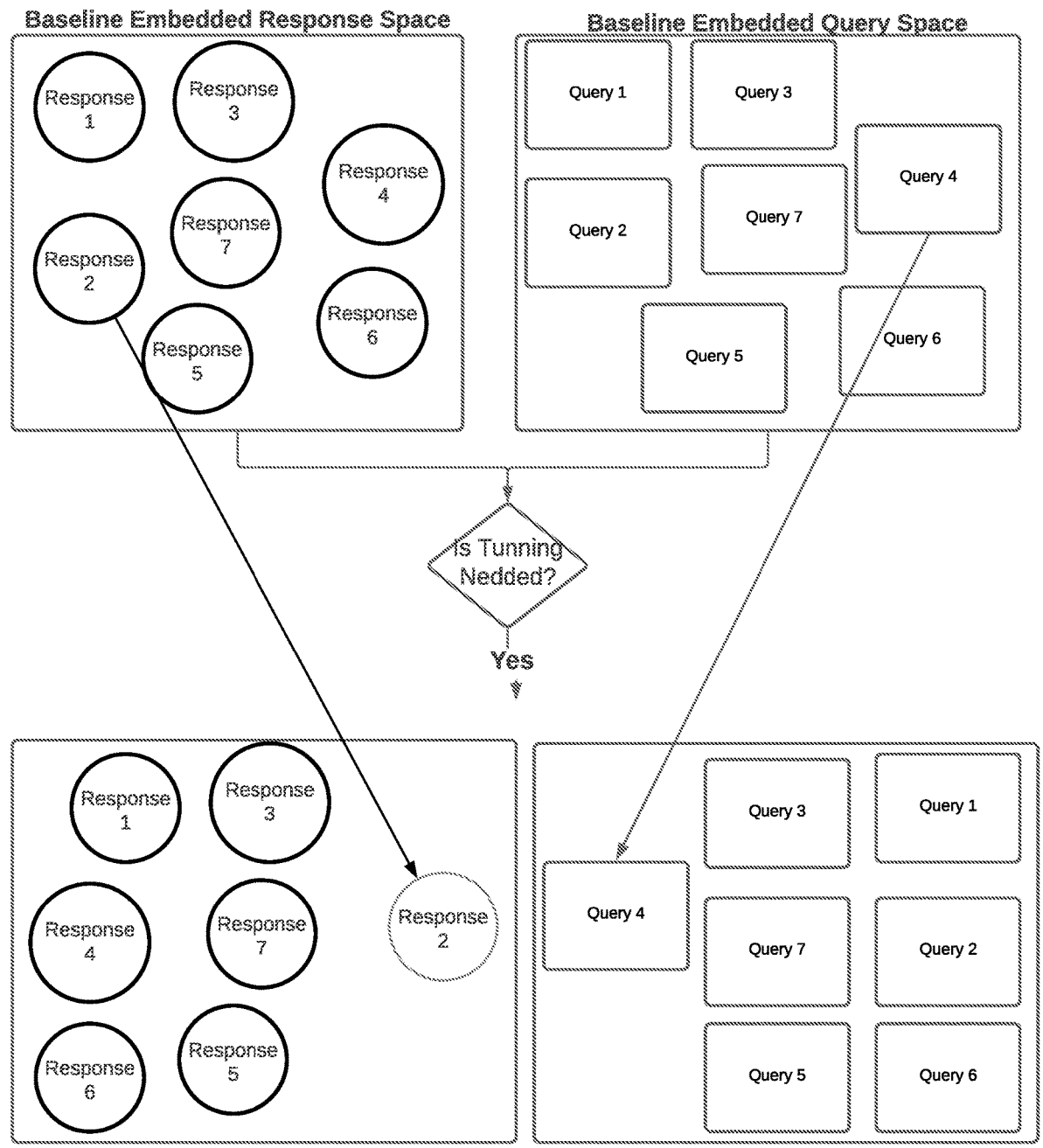
FIG. 9 illustrates an example representation of tuning a machine learning virtual agent in accordance with one or more embodiments of the present application.

Thus, in one or more embodiments, S340 may function to implement a zero-shot linking-based tuning that disambiguates a response selection and tunes a response behavior of a virtual dialogue agent with respect to a target query or target stimulus towards a preferred or aligned response embedding of the response corpus of the virtual dialogue agent, as shown generally by way of example in FIG. 9.

In a preferred embodiment, zero-shot linking-based tuning may include identifying a tuning pair of embeddings that includes a pairwise of a target query embedding with a target response embedding. In such implementation, the tuning pair of embeddings may be defined based on a computed misalignment between the target query embedding and the target response embedding, which may mean that a difference between a value of the target query embedding and a value of the target response embedding may be too great or too small therefore creating a misalignment during a response computation for a query or stimulus associated with the target query embedding.

In a first implementation, if or when it may be determined that a pairwise of a target query/target response embeddings are misaligned, S340 may function to nudge or move the embedding values of the pairwise by bending or collapsing the embedding values of the pairwise closer together. In one or more embodiments, the collapsing of the embedding values may include re-positioning an embedding value of the target response to a new position within of the embedding space of its embedding model, $M_r$, that would decrease a mathematical distance (e.g., a cosine distance) between the embedding value of the target response and the embedding value of the target query when evaluated together. In such embodiments, the tuning of the pairwise in this way better aligns and/or improves a zero-shot linking between the embedding values of the pairwise thereby disambiguating a response computation involving an associated query and associated response that may be linked to the embedding values of the pairwise. Stated differently, the embedding value of the target response may be changed to reduce the mathematical difference between the embedding values of the target query and the target response, which resultantly improves the distance position between the target query and the target response relative to other embedding values of other (formerly) ambiguous responses.

In a second implementation, if or when it may be determined that a pairwise of a target query/target response embeddings are misaligned, S340 may function to nudge the embedding values of the pairwise by stretching or extending the embedding values of the pairwise further apart. As in the first implementation, stretching or extending the embedding values of the pairwise includes re-positioning a location of the embedding value of the response, however, in this second implementation, S340 may function to increase the mathematical difference between the embedding values of the target query and/or the target response that define the pairwise. In this way, the extension of the embedding values of the target pairwise reduces a probability that a target response associated with the embedding value is selected during a response computation when the target query (or a semantically similar query) may be posed to a subject virtual dialogue agent.

As discussed in some detail in S330, a response computation for a target query or target stimulus to a virtual dialogue agent includes an input of the target query to one or more pre-trained language processing models that may each output a distinct response inference or prediction. In one or more embodiments, an embedding value of each response inference may be evaluated against embedding values of each potential response item of a response corpus of the virtual dialogue agent. Accordingly, by tuning or nudging one or more of the embedding values of the response items to be mathematically closer or further away from an embedding value of a target query causes a parallel or similar tuning between the response inferences based on an input of a target query, in that, the response inferences will either be mathematically closer or mathematically further away to the adjusted embedding value of a target response item during a response computation (e.g., similarity analysis).

It shall be noted that a tuning of a response behavior, as described herein, preferably includes re-adjusting one or more values of the embedding space of the response items and the embedding space of the queries/stimuli without changing or adjusting values of any of the pre-trained language processing models and the embedding models for queries and the response items of the response corpus. The resulting tuning is therefore of a zero-shot type (i.e., zero-shot linking) since no additional training or adjustments of the substantive machine learning and/or embedding models may be made.

It shall be further noted that, in one or more embodiments, the embedded response space and the embedded query space may have congruent (e.g., equivalent) dimensional spaces. However, in alternative embodiments, the embedded response space and the embedded query space may be non-congruent (e.g., different) dimensional spaces. Additionally, or alternatively, the embedded response space and the embedded query space need not to be distinct embedded space and may be represented in a single embedding space or distinct spaces.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method of building a zero-shot training, fast-generated machine learning-based virtual dialogue agent, the method comprising:

identifying a response corpus comprising a plurality of distinct response samples to likely user stimuli;

providing the response corpus, as model input, to a virtual agent generator comprising one or more pre-trained machine learning language models;

generating, by the one or more pre-trained machine learning language models, a distinct embeddings inference for each of the plurality of distinct response samples;

forming an embeddings-based architecture for response generation based on the distinct embeddings inference for each of the plurality of distinct response samples, wherein the embeddings-based architecture includes a mapping of the distinct embeddings inference for each of the plurality of distinct response samples to an n-dimensional space or an embeddings data structure;

configuring a proxy response matrix, wherein the configuring the proxy response matrix includes digitally tethering each distinct response sample of a subset of the plurality of distinct response samples to a distinct proxy response that is publicly returned if a computed distinct response sample comprises one distinct response sample of the subset;

instantiating, via a web-accessible user interface, a virtual dialogue agent based on receiving user stimuli; and computing, using the embeddings-based architecture, a response inference to the user stimuli, wherein the computing computed the response inference is based on:

identifying one distinct embeddings inference of a distinct response sample of the response corpus;

performing a look-up search of the proxy response matrix, wherein the look-up search comprises the one distinct embeddings inference or the distinct response sample; and identifying a distinct proxy response having a matrix-based association with the one distinct embeddings inference or the distinct response sample, and the response inference comprises the distinct proxy response.

2. The method according to claim 1, wherein the embeddings-based architecture is defined by creating a response nexus between each distinct response sample of the response corpus and each distinct embeddings inference of each of the plurality of distinct response samples of the response corpus.

3. The method according to claim 1, wherein each distinct proxy response of the proxy response matrix is a tunable response.

4. The method according to claim 1, further comprising:
configuring a response bank including:
digitally linking a distinct user stimuli to a distinct response sample of the response corpus;
computing a joint embeddings inference based on the digital linking; and
storing the joint embeddings inference in association with the distinct user stimuli and the distinct response sample.

5. The method according to claim 1, further comprising:
zero-shot tuning a response behavior of the virtual dialogue agent, wherein the zero-shot tuning includes:
expanding embeddings inferences of the response corpus by digitally linking a target distinct embeddings inference of a distinct response sample with an embeddings inference of an embeddings inference of a new response sample.

6. The method according to claim 1, further comprising:
zero-shot tuning a response behavior of the virtual dialogue agent, wherein the zero-shot tuning includes:
manipulating one or more embeddings inferences of the response corpus within the n-dimensional space by increasing or decreasing a multi-dimensional distance between the one or more embeddings inferences of the response corpus and an embeddings inference of a target user stimuli.

7. The method according to claim 1, further comprising:
zero-shot tuning a response behavior of the virtual dialogue agent, wherein the zero-shot tuning includes:
digitally linking a distinct user stimuli to a distinct response sample of the response corpus that causes one or more changes of the embeddings inferences of the plurality of distinct response samples within the n-dimensional space.

8. A method of building zero-shot training, machine learning-based virtual dialogue agents, the method comprising:

identifying a plurality of distinct response corpora, wherein each response corpus of the plurality of distinct response corpora comprises a domain-specific set of distinct response samples to likely user stimuli within the domain;

providing each of the plurality of distinct response corpora, as model input, to one or more pre-trained machine learning language models;

generating, by the one or more pre-trained machine learning language models, a distinct set of embeddings inferences for each of the response corpus of the plurality of distinct response corpora;

configuring a plurality of distinct virtual dialogue agents based on each response corpus of the plurality of distinct response corpora, wherein configuring each virtual dialogue agent includes:
forming an embeddings-based architecture for each of the plurality of distinct virtual dialogue agents based on the distinct set of embeddings inferences for each response corpus of the plurality of distinct response corpora, wherein the embeddings-based architecture includes a mapping of each distinct embeddings inference for each of the plurality of distinct response samples of a respective response corpus of the plurality of distinct response corpora to an n-dimensional space or an embeddings data structure;

configuring a proxy response matrix, wherein the configuring the proxy response matrix includes digitally tethering the distinct embeddings inference of each distinct response sample of a subset to a distinct proxy response;

selectively instantiating, via a web-accessible user interface, one or more of the plurality of distinct virtual dialogue agents based on receiving user stimuli; and computing, using the embeddings-based architecture, a response inference to the user stimuli that is derived based a distinct response sample of the respective response corpus of the plurality of distinct response corpora, wherein the computing the response inference to the user stimuli includes:
performing a look-up search of the proxy response matrix, wherein the look-up search comprises a distinct inference embeddings of the distinct response sample; and identifying a distinct proxy response having a matrix-based association with the distinct inference embeddings of the distinct response sample, and the response inference comprises the distinct proxy response.

9. A method of implementing a fast-generated virtual dialogue agent, the method comprising:
receiving user stimuli, via a web-enabled virtual dialogue agent interface;
converting the user stimuli, by a computer implementing one or more pre-trained language machine learning models, to a stimuli embeddings inference;
computing a response inference based on the stimuli embeddings inference, wherein computing the response inference includes:
implementing a proxy response matrix comprising a plurality of distinct response samples digitally tethered to a plurality of distinct proxy responses;
evaluating the stimuli embeddings inference against a plurality of distinct response embeddings of a corpus of distinct response samples;
performing an embeddings search for a response embeddings of a distinct response sample of the plurality of distinct response embeddings based on the stimuli embeddings inference; and
generating an automated response comprising a proxy response of the plurality of distinct proxy responses to the user stimuli, via the web-enabled virtual dialogue agent interface, based on returning the response embeddings of the distinct response sample, wherein the generating the automated response to the user stimuli includes:
performing a look-up search of the proxy response matrix, wherein the look-up search comprises the response embeddings of the distinct response sample or the distinct response sample; and
identifying the proxy response based on a matrix-based association of the proxy response to the response embeddings of the distinct response sample or the distinct response sample.

10. The method according to claim 9, wherein performing the embeddings search includes:
using the stimuli embeddings inference to search one or more embeddings-based data structures for an associated response embeddings.

11. The method according to claim 9, wherein performing the embeddings search includes:
identifying a response embeddings nearest the stimuli embeddings inference within a multi-dimensional space.

12. The method according to claim 9, wherein the user stimuli comprise a user query or a user utterance.

* * * * *